April 9, 1940. P. KOLLSMAN Re. 21,419

PRESSURE RESPONSIVE INDICATOR

Original Filed Dec. 10, 1931 2 Sheets-Sheet 1

INVENTOR
PAUL KOLLSMAN.
BY
ATTORNEY

April 9, 1940. P. KOLLSMAN Re. 21,419

PRESSURE RESPONSIVE INDICATOR

Original Filed Dec. 10, 1931 2 Sheets-Sheet 2

INVENTOR
PAUL KOLLSMAN.
BY
ATTORNEY

Reissued Apr. 9, 1940

Re. 21,419

UNITED STATES PATENT OFFICE 21,419

PRESSURE RESPONSIVE INDICATOR

Paul Kollsman, Woodhaven, N. Y., assignor, by mesne assignments, to Square D Company, Detroit, Mich., a corporation of Michigan Original No. 1,857,311, dated May 10, 1932, Serial No. 580,119, December 10, 1931. Application for reissue October 27, 1932, Serial No. 639,897

6 Claims. (Cl. 73—4)

This invention relates generally to pressure responsive indicators.

More specifically, the invention relates to that type of indicators or instruments described generally in my Reissue Patent No. Re. 19,079, dated February 13, 1934, said reissue patent having been granted on a divisional application of an application for reissue of my Patent No. 1,857,311, dated May 10, 1932.

According to a preferred embodiment of the invention to which this application relates, a pressure responsive indicator, often referred to as an altimeter, is provided which has, in general, mechanism in many respects similar to that described in more detail in my Patent No. Re. 19,079, above mentioned. This application, however, is directed more particularly to the invention illustrated by the embodiment disclosed in Figs. 5 and 6 of the drawings of my said Patent No. 1,857,311.

Although the novel features which are believed to be characteristic of this invention will be particularly pointed out in the claims hereto, the invention itself, as to its objects and advantages, and the manner in which it may be carried out, may be better understood by referring to the following description taken in connection with the accompanying drawings forming a part thereof, in which:

Figure 1:
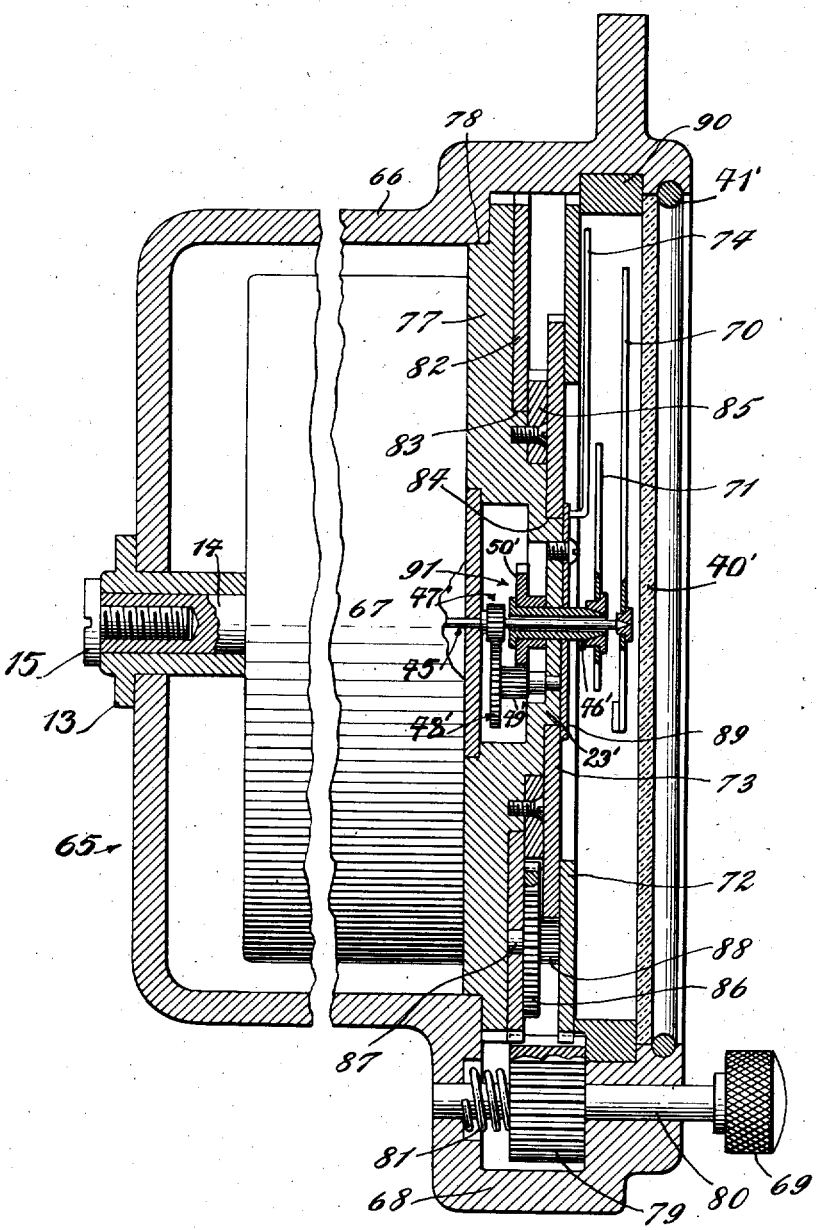
Fig. 1 is a vertical section through the altimeter at right angles to its normal position on the instrument board, with part broken away.

In the following description and in the claims, various details will be identified by specific names for convenience, but they are intended to be as generic in their application as the art will permit. Like reference characters denote like parts in the several figures of the drawings.

Figure 2:
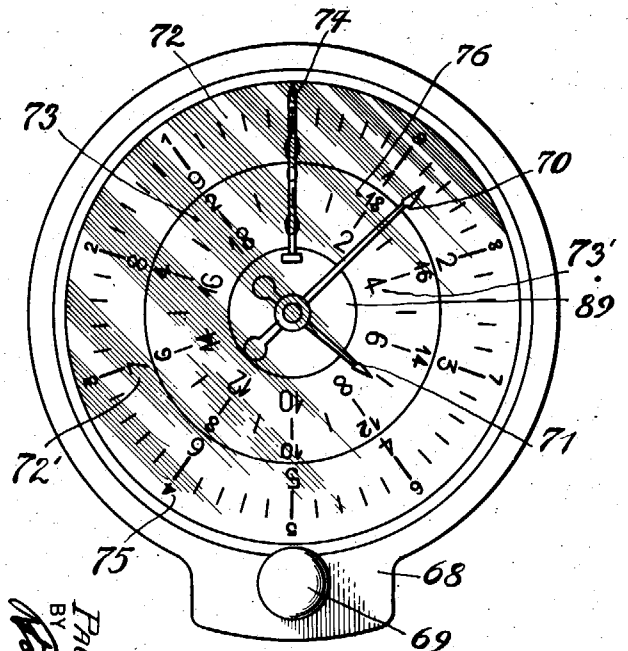
Fig. 2 is a front elevation of the instrument shown in Fig. 1, showing one setting of the instrument.

The indicator 65 preferably has the dial embodiment as shown in Fig. 2, although this is not the only pointer reference marker and dial arrangement which is operable by the mechanism of this modification. The housing or casing 66 is adapted to be mounted in the instrument panel in the position shown in the figures and includes any suitable pressure responsive means, such as aneroid means 67 similar to the aneroid means 11 mounted for possible rotary adjustment (as described in connection with the parts 13, 14 and 15 of my Reissue Patent No. Re. 19,079 hereinbefore mentioned). It is this means (aneroid 67) which operates the spindle 45 carrying the long pointer 70. The setting mechanism is mounted in an extension 68 of the housing 66, the knurled finger-manipulable knob 69 serving both to rotate the spur gear 79 and effect axial adjustment thereof through the medium of its spindle 80. The spur gear 79 is normally spring-pressed outwardly into the position shown in Fig. 1 by the compression spring 81. The cover plate for the aneroid means 67 is in the form of a large gear 77 circularly stepped at its periphery to bear in the angular portion 78 of casing 66. In front of gear 77 is a second gear 82 of the same diameter as gear 77 but itself ring-shaped and terminating inwardly against the step 83 of gear 77. A smaller diametered gear 85 is in front of gear 82 and holds it in place, gear 85 being fixed to gear 77, as by screws. Another gear 73 of smaller diameter than gears 77 and 82 but of larger diameter than gear 85, is in front of gear 85 and bears in the step 84 of gear 77, it being held in place by the front gear 72 and the disc 89. The gear 72 is of the same diameter as gears 77 and 82 and bears against the circular inner face of the housing 66, the split ring 90 holding it in place and also serving as a mounting for the glass 40'. The glass 40' may in turn be held in place by the expansion split ring 41'. A combination reference marker 74 is fixed relatively to the aneroid means 67 by being mounted on the disc 89, which in turn is secured to the gear 77.

A stub shaft 87 journaled in the gear 82 is fixed to and mounts gears 86 and 88 respectively meshing with gears 85 and 73 in a sun and planet relationship.

The short pointer 71 is driven from the spindle 45 of the aneroid means 67 through gear train 91, which comprises elements 47', 48', 49', and 50' (similar to the elements 47, 48, 49, and 50 of Figs. 1 and 2 of my said Reissue Patent No. Re. 19,079). There is, however, a difference between this gear train 91 and the corresponding gear train of Fig. 1, of my said Patent No. Re. 19,079, in that the stub shaft of gears 48' and 49' is mounted upon the ledge 23' integral, and therefore fixed, with gear 77, while the stub shaft of gears 48 and 49 of Fig. 1 of my said Patent No. Re. 19,079 was journaled to revolve relatively to the aneroid means for some adjustments.

In its preferred embodiment, the exposed face of gear 72 forms a dial carrying two scales, an outer scale 75 and an inner scale 72'. The exposed part of gear 73 likewise forms a dial and is provided with two scales, an outer scale 76 and an inner scale 73'. In this embodiment the scales 75 and 76 serve as reference scales in cooperation with the reference marked 74. Scale 75 is numbered from 1 to 10 counter-clockwise, the "1" indicating 100 foot altitude and the 10 a 1000 foot altitude. The other scale on dial 72 is similarly numbered clockwise from 1 to 10 and cooperates with the long pointer 70. The inner gear 73 bears an outer scale numbered counter-clockwise from 2 to 20; this is the reference scale cooperating with reference marker 74. The inner scale 73' on gear 73 is numbered from 2 to 20 clockwise and is the scale which cooperates with the short pointer 71. The gear train 91 for this embodiment is so proportioned as to effect a 20 to 1 angular speed of rotation between pointer 70 and pointer 71 under the operation of the aneroid means 67 through spindle 45. The planetary gear train 82, 86, 88, and 73 operated by spur gear 79 is so chosen as to effect the relative setting movement of gears 72 and 73 corresponding to the 20 to 1 ratio between pointers 70 and 71. For the setting of the gears, gear 72 is directly driven by spur gear 79, while gear 73 is indirectly driven by the differential planetary gearing operated by gear 82 which engages spur gear 79. When spur gear 79 does not engage gear 77 to drive it positively, but engages solely gears 82 and 72, the frictional engagement of gear 77 at 78 of the housing 66, holds 77 and the aneroid means 67 stationary relatively to the housing 66.

In Fig. 1, reference marker 74 and pointers 70 and 71 are shown vertical which is their proper position for sea level with zeros of all four scales 73', 76, 72' and 75, vertically upward.

Let us assume, however, that the plane carrying such an altimeter is flying at an elevation of 7,130 feet. Fig. 2 has been drawn to indicate this altitude of 7,130 feet relatively to sea level. Pointer 71 roughly indicates 7,130 feet on scale 73', the rotation of short pointer 71 being clockwise from the zero indication. Pointer 70 has been rotated by the aneroid means seven complete rotations and a fraction of an eighth rotation, indicating on scale 72' 130 feet, each small unnumbered scale division designating 20 feet.

Now, if it is the desire of the pilot to land on a landing field he may obtain the foot altitude of the landing field by wireless telephone, and if we assume that he receives information that the foot altitude of the landing field is 4,250 feet, it is more convenient for him to know the altitude above the landing field than above sea level. He may then set his instrument by a manipulation of the knob 69 so that the reference marker 74 on scales 75 and 76 indicates the altitude of the landing field and the pointers 70 and 71 indicate his elevation above the landing field. To effect this setting a counter-clockwise rotation is imparted to the knob 69. This rotation is continued until reference marker 74 indicates on scale 76 approximately 4,250 feet and the same reference marker 74 indicates on scale 75 accurately 250 feet.

Figure 3:
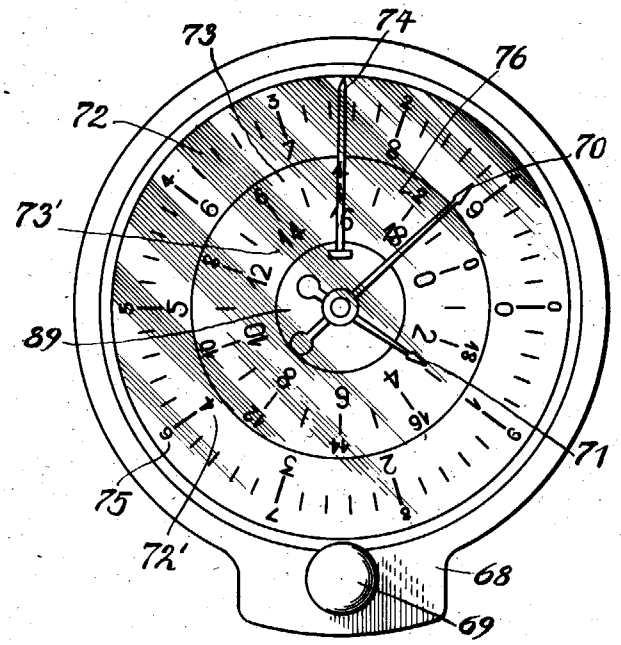
Fig. 3 is a front elevation of the same instrument showing another setting.

If there has been no change in elevation of the plane, the pointers 70 and 71 then indicate the altitude of the plane above the landing field; namely, 2,880 feet. Fig. 3 illustrates this condition for the altimeter, pointer 71 roughly indicating 2,880 feet and pointer 70 accurately indicating 880 feet.

Although four scales are involved in connection with this altimeter, the setting of the instrument in feet altitude is rather simple and the accurate reading of the elevation by means of the two pointers 70 and 71 over substantially any elevation range, is possible. It is to be understood that the gear ratio of 20 to 1 is not necessary between the pointers 70 and 71 and the scales 72 and 73, although this has an advantage in permitting a range of reading from sea level to 20,000 feet.

In this setting of the altimeter of Figs. 1, 2, and 3, it should be noted that the sum of the changes in setting for pointers and reference means is zero.

If it is desired to use the altimeter of Figs. 1, 2, and 3, to control level flight, the knob 69 may be pushed in against spring 81 to cause spur gear 79 to engage all three gears 72, 82, and 77 to rotate the entire internal aneroid mechanism until pointer 70 is in a horizontal position, such that a movement upward indicates a movement above level flight and a movement of pointer 70 downward indicates a movement of the plane below level flight. Such an adjustment does not disturb any previous setting of the scales or any operation of the pointers in response to barometric pressure changes.

In the above description of the instrument illustrated in Figs. 1, 2 and 3, it is to be noted that the reference marker 74 and the aneroid means remain stationary relatively to the casing 66 for an ordinary setting of the altimeter, while the dials move in a clockwise direction for setting and the pointers move also clockwise for an increase in foot altitude.

Although I have attempted to show many of the uses to which my invention may be put, including various embodiments thereof, it is, of course, obvious that it is impossible to show all the modifications which fall within the fair scope of my invention, as set forth in the following claims.

I claim:

1. A pressure sensitive altitude indicator having a casing, a plurality of pointer and settable scale elements for indicating values corresponding to barometric pressures, a reference element for the scale elements, actuating means for moving the different scale elements in different degrees for setting the same, and means coacting with said actuating means whereby a movement as a unit can be caused of the reference, pointer and scale elements relative to the casing.

2. An altimeter which comprises a pressure-sensitive element, a casing, movable pointers operated by said element in different ratios, rotatable dials cooperating with said pointers for indicating action, stationary reference means cooperating with the dials for indicating a predetermined condition, means for rotating said dials with respect to said pointers and reference means for setting the altimeter for the predetermined condition and means for rotating said pressure sensitive element, pointers, dials and reference means as a unit relative to said casing.

3. An altimeter including a casing, a pressure-responsive element, a plurality of pointers operated by said element, rotatable dials for the respective pointers, reference means for the respective dials, separate scales on each of said dials, one of the scales on each dial cooperating with its respective pointer for indicating action, another of the scales on each of said dials cooperating with the reference means for setting, and means for rotating said dials in different ratios with respect to said pointers and reference means to set the altimeter for a predetermined condition, said pressure-responsive element, pointers, dials and reference means being rotatable as a unit relative to said casing.

4. In an indicating instrument the combination of a casing, an actuating device and transmission mechanism therefor, pointer means operated by said device through said mechanism, scale means cooperating with said pointer means and rotatable with respect to the latter, stationary reference means cooperating with said scale means, and means for rotating said scale means with respect to said reference means and pointer means for setting the altimeter to establish a predetermined relation between the pointer, scale means and reference means so that said reference means will indicate a predetermined condition for which the instrument is adjusted and the pointer means will thereafter indicate when such predetermined condition occurs, said pointer means, scale means, and reference means being rotatable as a unit relative to said casing.

5. An indicating instrument including a casing, an actuating device, movable pointers operated by said device in different ratios, concentric rotatable dials rotatable with respect to said pointers, stationary reference means cooperating with the dials for indicating a predetermined condition for which the instrument is adapted to be set, and means for rotating said dials with respect to said pointers and reference means for setting the instrument for the predetermined condition so that the reference means indicate the predetermined condition and so that such a relation is established between the pointers and the dials that the pointers will produce a desired indication when the predetermined condition occurs, said actuating device, pointers and dials being rotatable as a unit with respect to said casing.

6. An aircraft altimeter comprising an atmospheric sensitive means, a plurality of scales movable in different degrees for reference setting, a plurality of pointers movable over said scales, one of said pointers being movable into level flight indicating position without changing the position of said pointers relative to said scales, a normally stationary reference marker for said scales, a unitary setting means for moving said scales in said different degrees and for moving said atmospheric sensitive means and pointers without changing the relative position of the pointers, so that one of the pointers assumes a level flight indicating position.

PAUL KOLLSMAN.